Patented Jan. 2, 1945

2,366,276

UNITED STATES PATENT OFFICE 2,366,276

ESTERS OF ALKOXYACETIC ACIDS

Raymond W. McNamee, South Charleston, W. Va., and Louis G. MacDowell, Lakeland, Fla., assignors to Carbide and Carbon Chemicals Corporation, a corporation of New York No Drawing. Application December 1, 1943, Serial No. 512,484

2 Claims. (Cl. 260—484)

This invention presents an improved synthesis of esters of alkoxyacetic acid.

The classic method of making alkoxyacetic acid from which its esters are derived, is to heat chloracetic acid with a sodium alcoholate. This method of ether synthesis is uneconomical because of the consumption of an atom of sodium and an atom of chlorine, which unite and are discarded as common salt.

According to this invention, alkyl esters of alkoxyacetic acid are prepared by the hydrogenolysis of glyoxylic acid ester dialkyl acetal. The new synthesis is economical, since all the reaction products are of recoverable value. The reaction may be illustrated as follows:

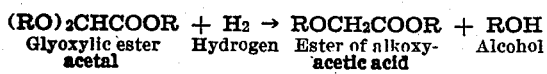

$(RO)_2CHCOOR + H_2 \rightarrow ROCH_2COOR + ROH$
Glyoxylic ester acetal    Hydrogen    Ester of alkoxyacetic acid    Alcohol The alcohol may be recovered and employed to form part of the glyoxylic ester acetal required in the reaction. The glyoxylic ester acetals may be formed by the simultaneous acetalization and esterification of glyoxylic acid with an alkanol, such as methanol, ethanol, isopropanol, butanol, 2-ethylhexanol and dodecanol. This reaction may be carried out by heating one mol of glyoxylic acid with at least three mols of the alkanol in the presence of an acid catalyst, and removing the water of reaction.

The hydrogenolysis of the glyoxylic ester acetal is carried out in the liquid phase at temperatures of 150° to 400° C., preferably 200° to 300° C., under a hydrogen pressure of 200 to 2000 p. s. i. and in the presence of a nickel hydrogenation catalyst, preferably the commercial Raney nickel catalysts, such as described in United States Patent No. 1,563,587 to M. Raney. The amount of the catalyst may vary from 2 to 10% of the starting material.

The alkyl esters of alkoxyacetic acid are useful as high-boiling solvents and extractants.

The following example will illustrate the process details of the invention:

The di-n-butyl acetal of n-butyl glyoxylate (392 grams) and 16 grams of Raney nickel catalyst were charged to an autoclave, and subjected to a temperature of 225° to 250° C. A hydrogen pressure of 1000 p. s. i. was maintained for 1.5 hours. Upon distilling the hydrogenolysis products, a 58.5% yield of the n-butyl ester of n-butoxyacetic acid was obtained, as well as a corresponding amount of n-butanol. Some unchanged starting material was also recovered. n-Butyl n-butoxyacetate was identified by its boiling point of 115°–118° C. at 20 mm. of mercury, its specific gravity of 0.924 at 20° C., and by its equivalent weight of 191 by saponification (theoretical 188).

It is apparent that the invention is not to be limited by the foregoing specific example.

We claim:

1. The process for making alkyl esters of alkoxyacetic acid which comprises hydrogenolyzing glyoxylic acid alkyl ester dialkyl acetal in the presence of a nickel hydrogenation catalyst at a temperature of 150° to 400° C., and recovering an alkyl ester of alkoxyacetic acid from the hydrogenolysis products.

2. Process for making n-butyl n-butoxyacetate which comprises hydrogenolyzing the di-n-butyl acetal of n-butyl glyoxylate in the presence of a nickel hydrogenation catalyst at a temperature of 200° to 300° C., and recovering said n-butyl n-butoxyacetate from the hydrogenolysis products.

RAYMOND W. McNAMEE.
LOUIS G. MacDOWELL.